(12) United States Patent
Rinaldi

(10) Patent No.: US 8,288,958 B2
(45) Date of Patent: Oct. 16, 2012

(54) DYNAMIC APPLICATION OF CUT-OUT PULSES IN ALTERNATING CURRENT POWER

(76) Inventor: Vito Rinaldi, Markham (CA)

(*) Notice: Subject to any disclaimer, the term of this patent is extended or adjusted under 35 U.S.C. 154(b) by 220 days.

(21) Appl. No.: 12/706,243

(22) Filed: Feb. 16, 2010

(65) Prior Publication Data

US 2011/0199016 A1 Aug. 18, 2011

(51) Int. Cl.
*H05B 37/02* (2006.01)
(52) U.S. Cl. .......... 315/291; 315/209 R; 315/294; 315/297; 315/307; 315/308; 363/36; 363/87; 363/118
(58) Field of Classification Search .......... 315/291, 315/294, 297, 209 R, 307, 308, 312; 323/237, 323/217, 300, 320; 363/118, 129, 149, 87, 363/36
See application file for complete search history.

(56) References Cited

U.S. PATENT DOCUMENTS

| | | | |
|---|---|---|---|
| 5,736,795 | A | 4/1998 | Zuehlke et al. |
| 6,225,759 | B1 * | 5/2001 | Bogdan et al. ............ 315/291 |
| 6,525,490 | B1 | 2/2003 | Rinaldi |
| 6,674,248 | B2 | 1/2004 | Newman, Jr. et al. |
| 6,784,622 | B2 | 8/2004 | Newman, Jr. et al. |
| 2010/0007284 | A1 | 1/2010 | Otte |

FOREIGN PATENT DOCUMENTS

| | | |
|---|---|---|
| CA | 2684566 | 11/2008 |
| CA | 2699586 | 3/2009 |
| CA | 2698606 | 4/2009 |

OTHER PUBLICATIONS

U.S. Appl. No. 12/706,188, filed Feb. 16, 2010, Rinaldi.
PCT, International Search Report, Jun. 16, 2011, pp. 1-5.
PCT, Written Opinion of the International Searching Authority, Jun. 16, 2011, pp. 1-3.
PCT, International Search Report, Jun. 23, 2011, pp. 1-5.
PCT, Written Opinion, Jun. 23, 2011, pp. 1-6.
U.S. Appl. No. 12/717,770, filed Mar. 4, 2010, Rinaldi.
PCT, "International Search report," Jun. 17, 2011, pp. 1-4.
PCT, Written Opinion of the International Searching Authority, Jun. 17, 2011, pp. 1-6.

* cited by examiner

*Primary Examiner* — Douglas W Owens
*Assistant Examiner* — Jonathan Cooper
(74) *Attorney, Agent, or Firm* — Haynes and Boone, LLP

(57) ABSTRACT

A controller device and corresponding method for modifying an AC input power to provide a reduced power AC output power to a load when coupled to the controller device. The AC output power has a series of cut-out pulses in half cycles of the AC output power waveform. The device includes a switching system having a plurality of switching elements for positioning the series of cut-out pulses in the half cycles of a waveform of the AC input power to result in said reduced power AC output power; and a switch control system for coordinating opening and closing of the plurality of switching elements during positioning of the series of cut-out pulses. The switch control system includes a synchronization system for synchronizing the switching system with timing of said half cycles of the AC input power waveform; wherein the series of cut-out pulses includes at least two cut-out pulses having different durations and different positioning in said half cycles.

20 Claims, 11 Drawing Sheets

DYNAMIC APPLICATION OF CUT-OUT PULSES IN ALTERNATING CURRENT POWER

FIELD OF THE INVENTION

This invention relates to the application of cut-out pulses to alternating current power.

BACKGROUND OF THE INVENTION

As energy costs increase and the use of electric lighting and motors expands, more and more attention is being given to the design of efficient electrical systems. In today's environment of power conservation, power reduction systems are available to make reductions in available line power for subsequent application to varied loads, such as lighting systems. One such example is described in U.S. Pat. No. 6,525,490 for Power Saving Circuitry. However, synchronization of the power reduction systems can become problematic for experienced analogue variations in line power. Further, it is recognised other variations can occur in line power, such as voltage/current fluctuation due to noise introduced into the supply line, which can affect synchronization between power reduction equipment and the line power and can affect the introduction of cut-out pulses in the line power.

For example, current operation of power reduction equipment is coordinating using analogue based techniques, which is disadvantageous due to analogue variations in the line power that can affect the consistent introduction of cut-out pulses in the line power.

SUMMARY OF THE INVENTION

In varying preferred embodiments, an advantage of the present invention is to provide a power control device to address at least one of the above presented problems.

It is recognised that needs in current power reduction equipment are dynamically variable power reduction techniques to provide for variable waveform modification on a cycle or per half cycle capability. As well, synchronization of the power reduction systems can become problematic for experienced analogue variations in line power. Further, it is recognised other variations can occur in line power, such as voltage/current fluctuation due to noise introduced into the supply line, which can affect synchronization between power reduction equipment and the line power and can affect the introduction of cut-out pulses in the line power. For example, current operation of power reduction equipment is coordinating using analogue based techniques, which is disadvantageous due to analogue variations in the line power that can affect the consistent introduction of cut-out pulses in the line power. Contrary to current power reduction systems there is provided a controller device and corresponding method for modifying an AC input power to provide a reduced power AC output power to a load when coupled to the controller device. The AC output power has a series of cut-out pulses in half cycles of the AC output power waveform. The device includes a switching system having a plurality of switching elements for positioning the series of cut-out pulses in the half cycles of a waveform of the AC input power to result in said reduced power AC output power; and a switch control system for coordinating opening and closing of the plurality of switching elements during positioning of the series of cut-out pulses. The switch control system includes a synchronization system for synchronizing the switching system with timing of said half cycles of the AC input power waveform; wherein the series of cut-out pulses includes at least two cut-out pulses having different durations and different positioning in said half cycles.

A first aspect provided is a controller device for modifying an AC input power to provide a reduced power AC output power to a load when coupled to the controller device, the AC output power having a series of cut-out pulses in half cycles of the AC output power waveform, the device comprising: a switching system having a plurality of switching elements for positioning the series of cut-out pulses in the half cycles of a waveform of the AC input power to result in said reduced power AC output power; and a switch control system for coordinating opening and closing of the plurality of switching elements during positioning of the series of cut-out pulses, the switch control system including a synchronization system for synchronizing the switching system with timing of said half cycles of the AC input power waveform; wherein the series of cut-out pulses includes at least two cut-out pulses having different durations and different positioning in said half cycles.

A second aspect provided is a method for modifying an AC input power to provide a reduced power AC output power to a load when coupled to the controller device, the AC output power having a series of cut-out pulses in half cycles of the AC output power waveform, the method comprising the steps of: synchronizing timing of the series of cut-out with timing of the half cycles of the AC input power waveform; positioning the series of cut-out pulses in the half cycles of the waveform of the AC input power via a plurality of switching elements to result in said reduced power AC output power; and coordinating opening and closing of the plurality of switching elements during positioning of the series of cut-out pulses; wherein the series of cut-out pulses includes at least two cut-out pulses having different durations and different positioning in said half cycles.

BRIEF DESCRIPTION OF THE DRAWINGS

In order that the subject matter may be readily understood, embodiments are illustrated by way of examples in the accompanying drawings, in which.

DETAILED DESCRIPTION OF THE PREFERRED EMBODIMENTS

Figure 1:
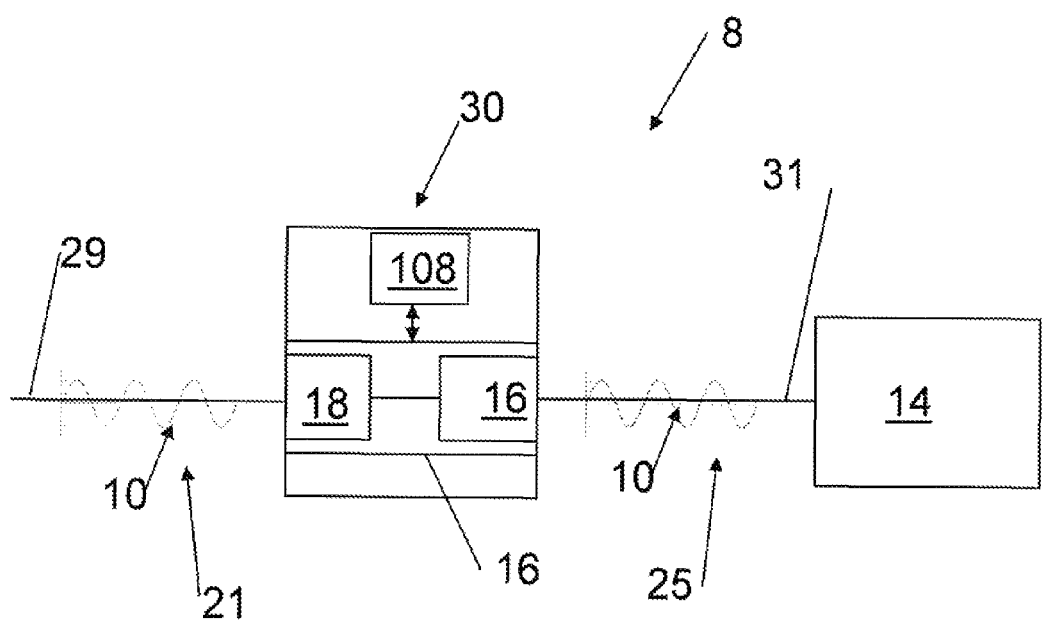
FIG. 1 is a block diagram of power reduction system for processing AC input line power.

For convenience, like numerals in the description refer to like structures in the drawings.

Power Control Environment 8

Referring to FIG. 1, shown is a power control environment 8 having a power control device 30 for introducing (and managing) a customizable power reduction in alternating current (AC) line power 21 received/input from a carrier medium 29 (e.g., transmission wire/line) to produce/generate modified alternating current (AC) power 25 for output/consumption by a load 14. It is recognised that one example of the device 30 is for generating the AC modified power 25 and subsequently supplying the AC modified power 25 via a load line 31 to the load 14 (e.g., a series of fluorescent or HID lights in a building, an electrical motor, or any other electrical load system that exhibits resistive, inductive, capacitive load characteristics and/or any combination thereof). For example, it is recognised that the load 14 can have a only resistive characteristics, only resistive and capacitive characteristics, only resistive and inductive characteristics, or resistive, inductive, and capacitive characteristics.

The power output 25 of the power control device 30 can be proportional to the number, location, and/or duration (width) of pulse cut-outs 27 (see FIG. 4) introduced, symmetrically in normal operation and asymmetrical in special case operation, into each half-cycle 15,17 (see FIG. 2) of the waveform 10 of the line power 21, which can be adjustable over a wide range (selected variation in number, location, and/or duration) by an optional processor 108 coordination/control (see FIGS. 1 and 8), further described below. For example, it is recognised that the positioning, width, and number of the pulse cut-outs 27 in one of the half cycles 15 can be symmetrical with the other half cycle 17 of the waveform 19. In other cases, it is recognised that the positioning, width, and/or number of the pulse cut-outs 27 in one of the half cycles 15 can be asymmetrical with the other half cycle 17 of the waveform 19.

Depending on the type of load 14 coupled to the device 30, the power output 25 can be adjusted from a defined minimum power percentage (or zero) of the line power 21 to a defined maximum percentage (or full) (either through semiconductor switches 12,26 or through directly connected, in bypass mode, for example) of the line power 21. For example, the introduction of a plurality of cut-out pulses 27 of a combined duration of the entire half cycle 15,17 would result in the modified power 25 being zero percent of the input line power 21, while the introduction of no cut-out pulses 27 in the half cycles 15,17 would result in the power 25 being one hundred percent (i.e., unmodified) of the input line power 21. It is recognised that introduction of some cut-out pulses 27 of a combined duration less than the entire half cycle 15,17 would result in the modified power 25 being between zero and one hundred percent of the input line power 21, as further described below.

The power reduction exhibited in the modified AC power 25 is provided by introducing the controlled pulse cut-outs 27 (e.g., a multiple pulse structure consisting of one or more cut outs in each half cycle) in a main line voltage/current waveform 10 of the line power 21. The aim of the device 30 is to reduce power consumption of the coupled loads 14, while at the same time provide substantive operational (e.g., inhibit lighting intensity variations, control motor speed) differences of the load 14 as desired by the user. In other words, the affect of the reduced power of the modified AC power 25 still provides for operation of the load 14 above an operational threshold (e.g., degree of lighting intensity for lighting loads, motor speed for electrical motors, etc.). The operational threshold can be supplied as a parameter 41 (see FIG. 8) to a microprocessor 108 coupled to the switching system 16 (see FIG. 1) for coordinating operation of the switching system 16 to affect the timing, position, duration, and/or number of pulses 27 in the line power 21, as further described below.

It is also recognised that the frequency characteristics of the waveform 10 for the modified power 25 can be the same as the frequency characteristics of the waveform 10 for the original line power 25 (i.e., the frequency of the power 21 is the same as the frequency of the power 25 and the phase of the power 21 is the same as the phase of the power 25), for example. It is also recognized that the modified half cycles 15,17 (through skipping alternate or otherwise selected half cycles 15,17) can be applied in modified frequency systems such as cycloconverters. For example the modified half cycle 15,17 can be applied for the first half cycle 15 and skipped for the next half cycle 15 (the same for the negative half cycle 17) so as to generate a pseudo half frequency power delivery system for motors 14. It is recognised that the application of the controlled pulse cut-outs 27 in the waveform 10 can be optimized concerning the number of, placement of, and/or width of the cut-outs 27, as further described below. In other words, application of the pulse cut-outs 27 can be applied to a half cycle 15 and then not applied to (i.e., skipped for) a selected subsequent similar (e.g., next) number of half cycle(s) 15 (e.g., every other half cycle 15 can have cut-outs 27 applied). Similarly, application of the pulse cut-outs 27 can be applied to a half cycle 17 and then not applied to (i.e., skipped for) a selected subsequent similar (e.g., next) number of half cycle(s) 17 (e.g., every other half cycle 17 can have cut-outs 27 applied). The skipped application of pulse cut-outs 27 in the half cycles 15,17 can be done symmetrically (e.g., treating each corresponding half cycle 15,17 of a full cycle 19 the same) or asymmetrically (e.g., treating each corresponding half cycle 15,17 of a full cycle 19 differently), as desired. The modified frequency of the line power 21 can be effected through selection of an appropriate modified frequency pattern 51 of the predefined patterns 50 (see FIG. 8,11) available for selection and application by the microprocessor 108, as further described below.

Further, the device 30 has a synchronization system 18 for determining/identifying the frequency F, phase, and amplitude of the current/voltage 10 of the supplied line power 21 as well as the cross over points 32 (see FIG. 2) used to define the start and stop (or phase position in real time) of each half cycle 15,17 of the waveform 10. It is recognised that determined frequency F (and associated cross-over points 32) can be used to coordinate application of the controlled pulse cut-outs 27 to the waveform 10 of the supplied line power 21. The synchronization system 18 and the pulsed cut-outs 27 are included, for example, as part of a switching apparatus 16 (e.g., driver circuit) of the device 30, as further described below, for generating the modified waveform 10 of the load power 25.

Load 14

It is recognised that the load 14 could be any lighting load 14 that contains resistive, inductive and/or capacitance characteristics or any combination thereof. For example, the load 14 could be one or more fluorescent lamps/tubes (and their associated ballasts) as and example of gas-discharge lamp that uses electricity to excite mercury vapour and as in incandescent bulbs to control the temperature and light output of the filament. It is recognised that the loads 14 could also be other more generic gas-discharge lamps as an artificial light source that generates light by sending an electrical discharge through an ionized gas, i.e., plasma discharge. Examples of the lighting loads 14 include types such as but not limited to: low pressure discharge lamps; high pressure discharge lamps; high intensity discharge lamps; or a combination thereof. Different types of fluorescent lamps are such as but not limited to: T2; T4; T5; T8; T9; T12; T17; and PG17, and incandescent bulbs (with or without an included voltage transformer such as pot lights) etc.

It is also recognised that the loads 14 can include electrical motors or other electrical systems that include resistance, inductance and/or capacitance elements in their system. One example of an inductive element is a transformer or the motor winding(s) itself.

It is recognised that loads 14 as electrical motors can be defined as small, medium or large sized motors of standardized dimensions and characteristics to provide convenient mechanical power for industrial uses. Small electric motors can be used in application such as fans. Larger electric motors can be used for propulsion of large vehicles such as cars or ships. Electric motors may be classified by the source of electric power, by their internal construction, and by their application. For example, the controller 30 can be used to augment the idle current, idle power along with torque and/or speed of the electrical motor load 14 through modification of the AC power 25 feeding the motor.

Current/Voltage Waveform 10

In general, alternating electric current (and corresponding voltage) varies periodically in value and direction, first flowing in one direction in a circuit and then flowing in the opposite direction; such that each complete repetition is called a cycle, where the electric current rises to a maximum in the one direction, falls back to a reference value (e.g., zero) and then rises to a maximum in the opposite direction and then repeats. The number of repetitions per second is called the frequency; usually expressed in Hertz (Hz). The cross over point between the cycles is the reference value of the electric current (and corresponding voltage), for example 0 Volts or 0 Amperes. It is recognized that the described controller 30 can effect a modified output 25 frequency different than the input 21 frequency such as used with cycloconverters, for example using alternating or other number selection of half cycles 15,17 in which to skip the application of the pulse cut-outs 27.

Referring again to FIG. 2, alternating current/voltage waveform 10 is defined as the flow of electric charge that reverses periodically about a reference point 32. The current/voltage waveform 10 starts from the reference value 32 (e.g., zero cross), grows to a maximum value 34 and then decreases again to the reference value 32 in a first half cycle 15. The current/voltage waveform 10 then reverses direction to reach a minimum value 36 in a direction opposite from the reference value 32 (as compared to the direction towards the maximum value 34) and then returns again to the reference value 32 in a second half cycle 17, and repeats the half cycles 15,17 in alternate.

The time taken to complete one cycle waveform 19 (as a combination of the two half cycles 15+17) is called a period, and the number of cycles 19 per second is defined as the frequency f of the current/voltage 10. Further, the maximum value 34 and or 36 in either direction can be the current's/voltage's amplitude. Examples of frequencies F are 50-60 cycles per second (i.e., 50-60 Hz) used for domestic and commercial power. It is recognised that the current/voltage waveform 10 can be other frequencies F, such as 30 Hz to 120 Hz for electric locomotives and such as higher frequencies F used in television (e.g., 100 MHz) and in radar and microwave communication (e.g., 2.5 GHz). It is recognised that the duration/period of one cycle 19 can be defined in degrees, such that one cycle 19 extends from 0 to 360 degrees and each half cycle 15 or 17 is 180 degrees in duration.

Accordingly, one complete period, with current flow first in one direction and then in the other, is called the cycle 19 of the current/voltage waveform 10, and 60 cycles per second (60 hertz, Hz) is the customary average frequency F of alternation in the United States and in all of North America. In Europe and in many other parts of the world, the customary average frequency F is 50 Hz. One example of a custom/specialized frequency F for the current/voltage waveform 10 is on marine ships and aircraft, approximately 400 Hz, that is used to make possible lighter weight electrical machines.

Figure 2:
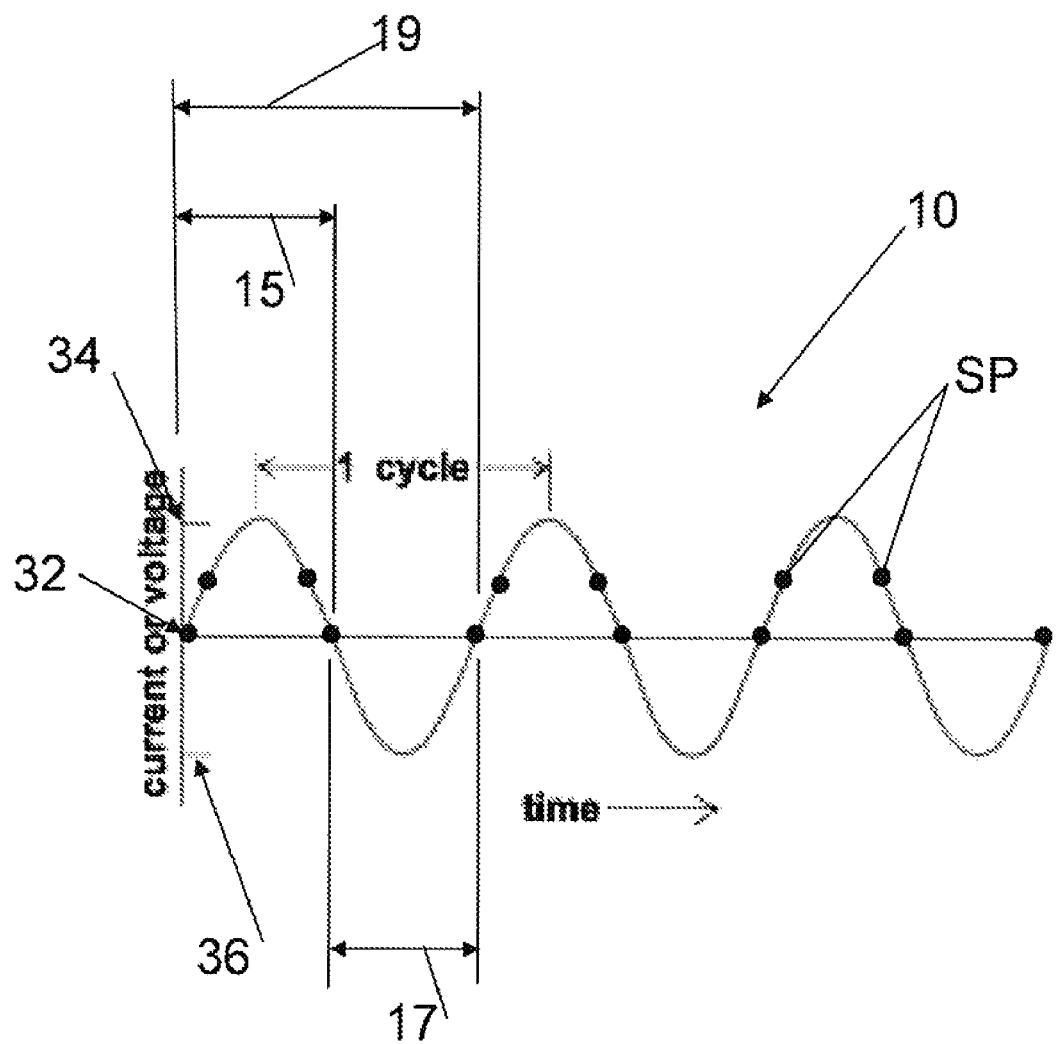
FIG. 2 shows an alternating power waveform processed by the system of FIG. 1.

In view of FIG. 2, it is recognised that a sinusoidal form of current, or voltage waveform 10, is usually approximated on practical power systems (used to generate and supply the voltage/current waveform 10 as line power 21—see FIG. 1) because the sinusoidal form can provide for less expensive construction and greater efficiency of operation for line power 21 electric generators, transformers, motors, and other machines. However, in certain applications, different waveforms can be used, such as but not limited to: triangular or square waves. Audio and radio signals carried on electrical wires (or other electrical conductive elements) are also examples of alternating current/voltage waveforms 10.

Noise

Referring again to FIG. 2, it is recognised that variations from the nominal operational voltage or current waveform 10 on a power or signal line 29 (see FIG. 1) can occur, such that the actual voltage/current waveform 10 value fluctuates about or away from the theoretical or steady state values defined for the particular waveform of the supplied voltage/current waveform 10. For example, in electronics and communication systems, noise is a random fluctuation or variation of an electromagnetic analog signal such as the voltage/current waveform 10, which can consists of sudden step-like or additive/subtractive sinusoid or quasi sinusoid transitions between two or more levels (non-Gaussian) at random and unpredictable times. In this manner, it is recognised that the timing of the line power 21 is synchronized by the synchronization system 18 with the application of the cut-outs 27, as further described below.

Switching Apparatus 16 and Corresponding controlled Switches 42

Figure 3:
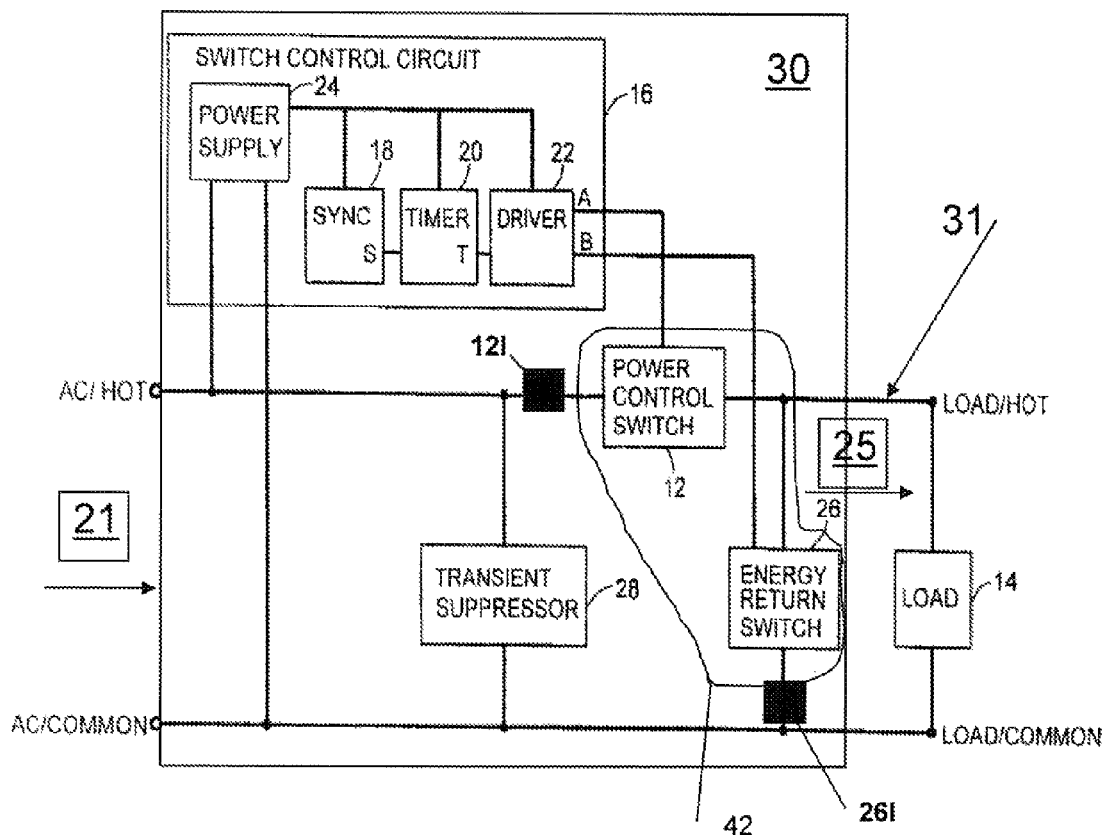
FIG. 3 is an embodiment of the power reduction system of FIG. 1.

Referring to FIG. 3, shown is an example switching control apparatus/system 16 of the control device 30, which is connected in series between the load 14 (e.g., lighting) and the main line voltage 21—hot, as well as in parallel between the load 14 line voltage 21—common. The example control device 30 contains a bilateral, power control switch 12 for connection in series with the load 14 (e.g., bilateral meaning that it is capable of conducting and switching waveform 10 current of either polarity), such that opening and closing of the power control switch 12 provides for the pulse structure 27 introduced in the voltage/current waveform 10 generated on the load line 31, i.e., the modified power 25. The power control switch 12 can be embodied as a bilateral, high speed, power control switch for switching on and off the current 10 from the AC power supply 21 to the load 14 during both the positive and negative half-cycles 15,17 of the AC cycle 19 of the waveform 10. The term "high speed" when used herein to describe the power control switch 12 (or the energy return switch 26 referred to below) can refer to a switch mechanism capable of providing a switch duration in the order of specified minimum duration (e.g., a few nanoseconds or less) for introducing the cut-outs 27 in the waveform 10.

The example control device 30 also contains a bilateral, high speed, energy return switch 26 for connection in parallel with the load 14, such that where the load 14 has inductive and/or capacitive characteristics, the load 14 will contain stored energy and the energy return switch 26 will provide for the device 30 to make use of this stored energy during open circuit operation of the power control switch 12. The power control switch 12 and the energy return switch 26 each can contain one or more switching elements of a switch system 42. The two switches 12 and 26 can be operated in opposition (one on the other off) which is desirable for resistive, resistive-inductive, resistive-inductive-series capacitance type loads 14. Or the two switches 12 and 26 can be operated in synchronization for switch 12 "on-conducting" and switch 26 "always off-not conducting" for paralleled load, such as a load 14 consisting of a ballast with power factor correcting capacitors at the load 14 input.

The example control device 30 also contains a driver circuit 22 connected to the power control switch 12 and energy return switch 26 for controlling the opening and closing of their switches (i.e., affecting the flow of power to and from the load 14 along the line 31. The driver circuit 22 can cause the energy return switch 26 to be open when the power control switch 12 is closed and the energy return switch 26 to close when the power control switch 12 is opened, for example. In any event, it is recognised that the driver circuit 22 affects the positioning and/or width of the cut-outs 27 in the waveform 10 of the power 21 to result in the modified waveform 10 (including the cut-outs 27) of the modified power 25.

For exemplary purposes only, only one pulse (or power notch) 27 is shown in 4 as symmetrically positioned in the half cycles 15,17. In actual implementation, there can be any number of pulses 27 at different locations on the sine wave 19, Each separate pulse 27 can have a distinct or common/uniform pulse width. Each pulse 27 can have a distinct or common/uniform position placement on the sine wave 19. The pulse(s) 27 and position(s) may also be modified dynamically by the microprocessor 108 according to external/internal control and/or load 14, line 21, or requirements. For example, a light intensity feedback signal can be introduced (directly connected or through overhead communications) and the unit 30 will adjust the number, width, positioning of the pulse(s) 27 to maintain constant light levels as programmed into the processor 108 operation. For another example, unit 30 can activate a bypass mode in unstable environments (unstable electrically, temperature or otherwise), such that the pulses 27 are prohibited from being inserted into the half cycles 15,17 for a selected time period and/or until the unit 30 is informed that the previously detected/identified instability in the line power 21 and/or load 14 operation is reported to the unit 30 as being fixed/over.

Figure 4:
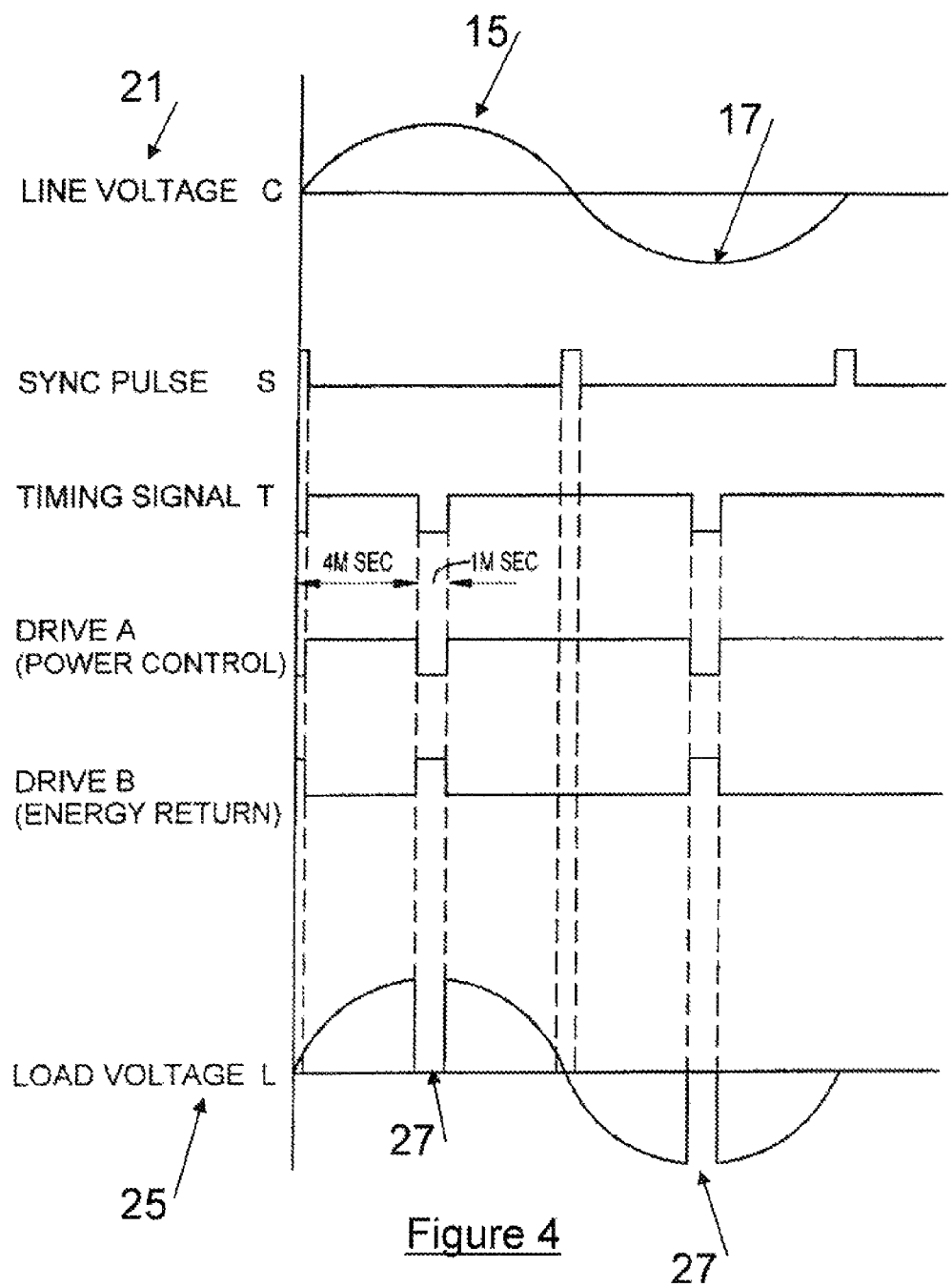
FIG. 4 shows example cut-out pulses introduced in the waveform by the power reduction system of FIG. 1.

The example control device 30 also contains a timer circuit 20 connected to the driver circuit 22 for controlling the operation of the driver circuit 22 so that the power control switch 12 is closed for a series of predetermined initial time periods and corresponding discrete predetermined final time periods during each half cycle 15,17 of the AC current (i.e., waveform 10), thus providing for generation of the pulse structure 27 in the waveform 10 of the modified power 25 (see FIG. 4 for exemplary cut-out 27). The timer circuit 20 is synchronized via the synchronizing system 18 with the voltage waveform 10 timing (i.e., timing of the cycles 15,17,19) of the main line power 21. When the power control switch 12 is closed, the voltage across the load 14 is connected to the power source 21-HOT and the voltage follows the incoming power 21 sine form. During this time switch 26 is open circuited. When switch 12 is opened and switch 26 is closed, the load voltage drops rapidly (i.e., sending a "square" pulse 27 of adjustable predetermined duration and position in the cycle 15,17). The energy return switch 26 conducts across the load 14 whenever the power control switch 12 is closed (i.e., not conducting), for example. In this manner, the energy return switch 26 returns the inductively stored load energy to the load 14 immediately following the opening of power control switch 12. The result is the modified line voltage waveform 10 (of the modified power 25) has repeating, synchronized pulse cut-outs 27 so that the power drawn from the main line and experienced by the load 10 is reduced. It is recognised that current may continue to flow through the load 14 (when the power control switch 12 is opened) due to inductive-resistive or series inductive-resistive-capacitive nature of the load 14.

For paralleled capacitive loads 14, switch 26 is open while the capacitor voltage is in the same direction as the supply voltage 21-HOT and switch 12 is open circuited. Switch 26 can be closed when the capacitor voltage reaches zero through L-C ringing or capacitive-energy depletion. Switch 12 can then be turned on with current limited pulsed 27 to charge up the load capacitance back to the power input level 21-HOT at the trailing end of pulse 27. This sequence of switch 12,16 operation can provide the re-use of capacitive energy without current related stressing or wasteful dissipative discharging of the capacitor. For this type of switch 12,16 operation, capacitive load, the device 30 uses current sensors 12I, 26I. A current sensor 12I is in series with Switch 12 and a current sense 26I is in series with switch 26, for example. A typical current sensor 12I, 26I can be an integrated, isolated hall-effect current transducer, for example. These current sensors 12I, 26I can be fast, relatively noise free and provide AC/DC instantaneous current sense.

Other current sense systems 12I, 26I may be used, such as current sense transformers. Or one may use series shunt (resistive) type current sensors 12I, 26I at or otherwise associated with each switch 12, 26. Or one may use semiconductor devices with built in current limit input circuitry. The current sensors 12I, 26I can be used to detect, both, the supply 29 and the load 31 current and to provide for analyse and control of the supply 29 and the load 31 current by the unit 30. The current sensors 12I, 26I can also be used, in conjunction with input 21 and output voltage 25 to calculate and control actual, real-time input 21 power and/or output 25 power and/or related power factor.

To instantaneously sense a resistive-inductive (or series inductive-capacitive) load 14, the switching apparatus 16 can be configured to can examine the load voltage polarity at the time when switch 12 is turned off (i.e., not conducting current). If the load 14 has an inductive characteristic, the load voltage 31 can be instantly reversed and the switch 26 is activated to by apparatus 16 operation to provide current conduction to continue. This is performed by the apparatus 16 in both directions for switch 26, to provide for the series resistive-inductive-capacitive ringing loads 14. Or switch 26 can be operated by the apparatus 16 in only one direction for purely resistive-inductive loads. Under these conditions, if switch 26 is not activated, the natural inductive load response over-voltage can destroy the switch 26 and likely the switch 12 as well.

It is recognised that inductors will generate whatever voltage is necessary to maintain current flow. This flow can be either through a low impedance, closed switch 12,16. Or the current and associated energy can flow through the high voltage arc of an air gap contact, or open switch 12,16, or through the open circuited solid state semiconductor switch 12,16. This semiconductor open circuit energy flow can result in a permanently shorted semiconductor failure. Some high speed semiconductor devices can offer built-in gate driver circuitry that place the semiconductor in recoverable, current conducting, voltage limited mode referred to as "Active Voltage Clamping". This active clamp feature is an element of semiconductor automotive ignition controls and can be included in the design of the switches 12 and/or 26. However the energy involved should be less than the "Safe Operating Area,"

"SOA" of the semiconductor device for reliable operation. In any case, this type of voltage limiting operation can result in an unacceptable loss of energy stored in the load 14. In most cases under consideration, the energy stored by the inductive load is far beyond the "SON" of the semiconductor common devices.

To dynamically sense a parallel capacitive load 14, the switching apparatus 16 and associated microprocessor 108 can be configured to examine the output voltage 25 at the instant that switch 12 is turned "off" (i.e., not conducting current). If the load 14 is capacitive, the voltage 25 value and polarity will not immediately change. The load voltage 25 can; [1] stay constant, [2] decrease in the common "L/R" decay or [3] ring sinusoidally in the common parallel "LC" resonant load response, with or without an energy decay envelope. In all of these conditions of parallel capacitive loads 14, switch 26 in superfluous. However, closing switch 26 at the voltage zero-cross of condition [3] can result in a more efficient recirculation of stored electric power. This can be especially true for lighting circuits 14. At the end of power notch 27, the voltage across the load 14 is brought back up to the line 26-HOT voltage potential. This is done by the apparatus 16 in a current controlled and current limited manner such that the capacitor surge current rating is not exceeded and similarly the supply 21-HOT is not overloaded.

A method, operated by the configured apparatus 16 and associated processor 108, of determining predominantly capacitive loads 14 is to close switch 26 in a current limited fashion. The current limit is that level of normal current expected in the load circuit 14. If the load 14 is predominantly inductive (i.e., without a parallel capacitor at the load terminals) the current in switch 26 will continue, in the same direction, at the level present at the time that switch 12 was opened (i.e., stopped conducting). This operation includes the case of series resistive-inductive-capacitive loads and combinations thereof, as long as the inductive portion is in series. If the load has a parallel capacitor then at the instant of closure of switch 26, the current will flow in the opposite direction. Using the current limiting feature, switch 26 can be allowed to continue conducting or 26 can be allowed by the switching apparatus 26 to go to a full blocking state. The full blocking state can be preferred but the current limiting operation is used in cases where the load 14 is capacitive, but the wiring distance can provide sufficient inductance as to cause high frequency voltage ringing and its associated, potentially damaging, voltage spiking. One solution is to configure switches 12 and 26 with current limiting as well as voltage limiting (i.e., "Active Voltage Clamping"). The microprocessor 108 or overhead electronics of the unit 30 can then decide which mode to switch to on a pulse-by-pulse 27 basis. This last control type can be suitable for all combinations of load 14 types (i.e., any combination of resistive, inductive, and/or capacitive). Alternately, switch 26 can be selectively turned on in one direction only, with associated sensing for electrically ringing loads. However, the current limiting is incorporated in switch 12 in order to bring the capacitive load back to the 21-HOT potential at the end of the switch 26 conduction period (i.e., the end of the load "off" pulse 27).

The example control device 30 can also optionally contain a power supply circuit 24 connected to the AC supply 21 of the main line for supplying suitable power to sub-systems 24,18,20,22,12,12I,26,26I. The power supplies can be, for example, using different diode and resistance elements connected in series with the AC supply 21. Alternatively, the controller 30 can be connected to a different power supply that is not connected to the main line power 21, for supplying suitable operational power to the sub-systems 24,18,20,22, 12,12I,26,26I, as desired.

Referring to FIG. 4, when a drive [A] signal from the driver circuit 22 terminates, the power control switch 12 ceases conducting, and the voltage across the load 14 drops rapidly. If load 14 is inductive and/or series inductive-capacitive, the load 14 contains stored energy and in order to make use of this stored energy, the energy return switch 26 is used. A second driver output signal drive [B] from the driver circuit 22 controls the operation of the energy return switch 26 such that the energy return switch 26 conducts when the drive [B] signal is high and is open when the drive [B] signal is low, for example. The driver circuit 22 is configured such that the drive [B] signal is substantially the opposite state of the drive [A] signal, thus causing the energy return switch 26 to conduct across the terminals of the load 14 whenever the power control switch 12 is not conducting. It is also recognised that the drive signals [A,B] can be configured to be off or non-current conducting at the same time. It is also recognised that the drive signals [A,B] cannot be configured to operate such that switches 12 and 26 are conducting current ("on") at the same time. The two switches 12,16 may, however, be configured to partially conduct at the same time, during their respective turn-on, turn-off transitions. This partial conduction operation is performed by the apparatus 16 within the limits allowed by the semiconductor Safe Operating Area (SOA). In this manner, the energy return switch 26 can return load energy to the load immediately following the opening of power control switch 12. Accordingly, the drive signals [A,B] are used to control the corresponding switch elements 12,26 of the switch system 42.

Transient Suppressor 28

For many types of loads 14, when the power control switch 12 ceases conducting, the current in the AC power supply line 29 is suddenly interrupted. The capability of the power control switch 12 to interrupt current in a very short time period can result in large, destructive over-voltage transients in the line voltage 21 due to inductances that exist in the power supply line 29. If left unabated, particularly at the start of pulse 27, the over voltage transients could permanently damage the power control switch 12, 26 and other active devices attached to the power line 29. To help reduce the over voltage transients to acceptable levels that appear on the power supply line 29 at the times in each half-cycle 15,17 (see FIG. 2) when the power control switch 12 ceases conducting, the power control device 30 can include a transient suppressor system 28 for connection across the AC power line 29 terminals. The transient suppressor system 28 can include an active voltage sensitive bilateral active, high speed, semiconductor device, connected in a form of the "Active Voltage Clamp" described above, such so that when the voltage potential between the AC hot and AC common terminal (see FIG. 4) reaches a pre-determined value, the transients suppressor 28 can conduct current until the voltage potential drops below the pre-determined value. The series 21 supply inductive energy may also be minimized by the use of appropriately place high frequency capacitors placed across the HOT-COMMON input power 21. The same energy may also be controlled by the use of Metal Oxide Varistors (MOV) or other voltage clamping (zener devices). It is recognized that this energy can also be suppressed by a combination of the above techniques.

Synchronization System 18

Referring to FIGS. 1 and 4, the synchronization system 18 includes a zero crossing identifier (for example by detecting when the polarity shifts from positive to negative, and from negative to positive at the reference value 32) in order to identify the reference points 32 defining the start and end points of the cycles 15,17—see FIG. 2). It is recognised that the synchronization system 18 could also be configured to detect the same position, e.g., a consistent sensing point SP on the waveform 10 such as a voltage sense point of a specified voltage level, that is located away from the reference value 32 of the waveform 10. It is recognised that it can be advantageous to position the sensing point SP away from the reference value 32, as waveform 10 noise levels (e.g., fluctuations in the voltage/current) can be higher in the vicinity of the reference value 32. Further, it is recognised that the highest rate of change in the voltage/current of the waveform 10 is experienced in the vicinity of the reference value 32, which may affect the accuracy of sensing the voltage/current when one is closer to the reference value 32. Once determined, the timing of the identified sensing points SP can be used to calculate the timing/position of the reference values 32 of the cycles 15,17. It is also implicit that, when the SP is sensed during but not at the zero 32 value, the time error can be minimal and calculable and adjustable by the system 18. It is recognised that the synchronization system 18 can also be used to determine the phase of the input power 21, as desired.

It is also recognized that sensing the SP at either the rising edge or the trailing edge of the half cycles 15,17 and not both edges can provide a very stable, repeatable synchronized power reference 32 for the supply power 21 (FIG. 2). Using this method by the system 18, the missing zero cross that is non-sensed, can be accurately calculated. Any sensing zero-cross delay may also be similarly calculated. When measurement if the sine wave amplitude is also included, the greatest accuracy of the zero-cross may be determined.

For example, knowledge of the waveform 10 frequency F for the upcoming cycle 19 (and half cycles 15,17) can be used to determine the period of the upcoming cycle(s) 19 and the time of the reference values 32 can be determined (e.g., via the mathematical equation of the waveform and the value of the reference value 32 itself). It is recognised that the synchronization of the switching apparatus 16 with the frequency of the line power 21 can be done once at the time of connection of the controller device 30 to the line power 21, can be done periodically while the controller 30 is connected to the line power 21 so as to check/confirm whether any changes in the timing of the waveform 10 of the line power 20 has occurred (e.g., due to frequency shift of the waveform 10); or in the extreme for each defined cycle 19 of the waveform 10 (e.g., checking every cycle 19, every second cycle 19, or any other defined number of cycles between checking of the frequency). It is recognised that checking of the synchronization between the switching apparatus 16 timing and the time dependent properties of the waveform 10 (of the line power 21), such as checking for the actual timing of the reference points 32 (see FIG. 2) provides for synchronized application of the cut-out pulses 27 to the appropriate positions in each half cycle 15,17.

Figure 11:
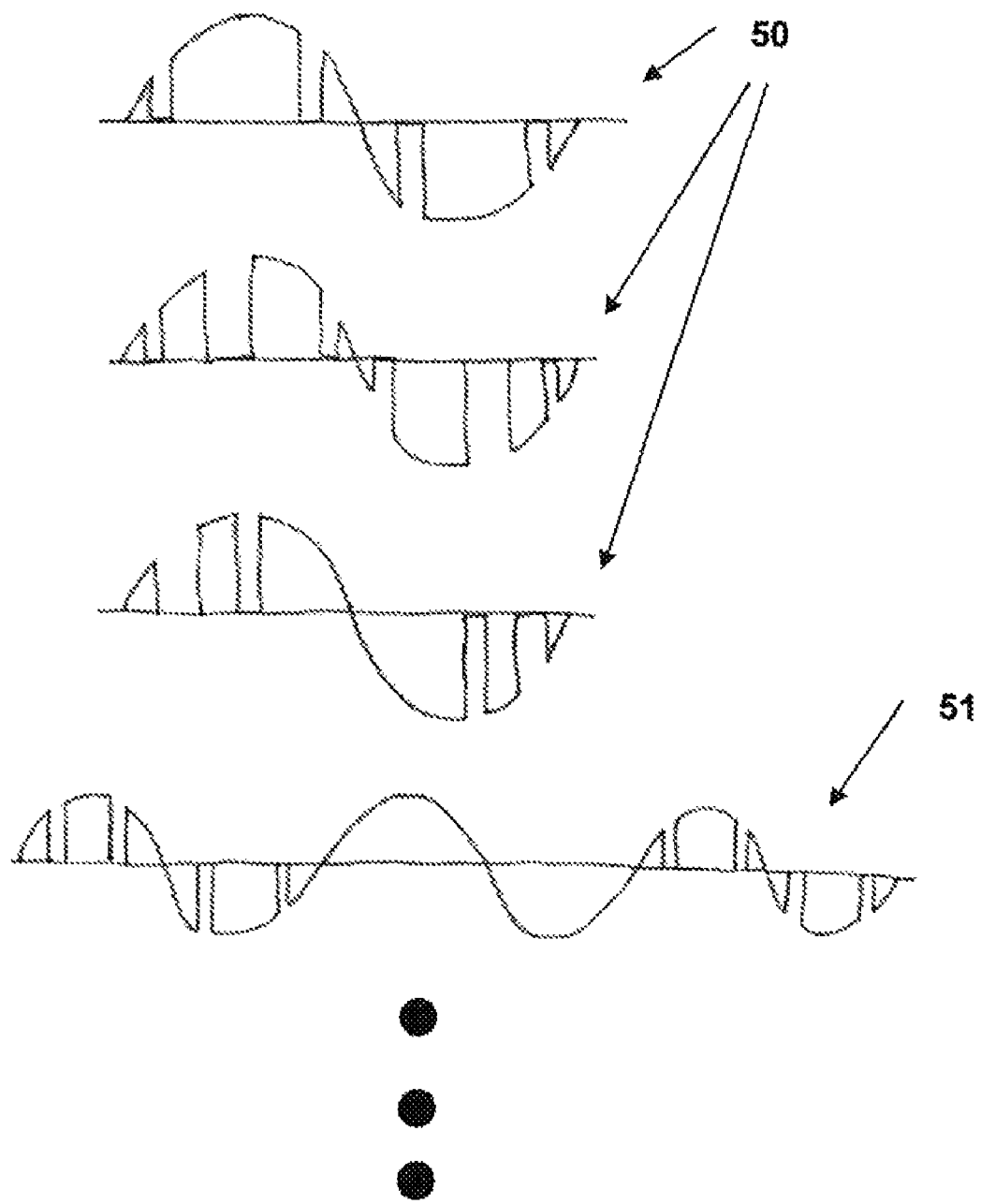
FIG. 11 shows example predefined pulse cut-out patterns for the microprocessor of FIG. 8.

For example, referring to FIG. 4, a synchronizing pulse [S] generated by the synchronization system 18, in phase with the AC line voltage C (of the power 21) for each half cycle 15,17, is shown. The synchronization system 18 is operatively connected to the timer system 20 such that the synchronization pulse [S] causes the timer system 20 to produce a timing signal T which consists of at least one square (or other shape) wave pulse of adjustable predetermined duration. The timer system 20 is configured to produce square wave pulses 27, each pulse of adjustable pre-determined duration with the second pulse terminating at a predetermined interval before the end of each half cycle 15,17 of line voltage [C]. The timing signal T is conducted to the driver circuit 22, which produces two output drive signals, [A and B]. The drive signal [A] controls the operation of the power control switch 12 such that the power control switch 12 conducts current when the drive [A] signal is high and is open when the drive [A] signal is low. The resulting load voltage [L] (i.e., power 25) is shown with introduced cut-outs 27. It is recognised that a respective synchronization pulse [S] and associated timing signal T can be used to produce each of the cut-out pulses 27 of the multiple pulses 27 in each half cycle 15,17 (see FIG. 5a,b). It is also recognised that a respective synchronization pulse [S] and associated timing signal T can be used to produce each of the cut-out pulses 27 of the multiple pulses 27 in each half cycle 15,17 as defined in the patterns 50,51 (see FIG. 11).

It is recognized that the modified voltage wave forms 25 can cause a corrective capacitive power effect, when positioned during the falling (trailing) slope of the respective half sine wave 15,17, which may be used to compensate for the inductive power factor found in most commercial installations. In other words, when this capacitive power factor corrected load 14 is placed on a power grid with inherently existing inductive loads 14, the net power factor for the grid will be close to unity. A resistive load 14 can be shown to behave as if it were a capacitor for power factor measurements.

It is also recognized that the opposite, inductive, power factor correction effect can be effected when the pulse(s) is (are) placed during the rising (leading edge of the half sine power 15,17. A resistive load 14 can be shown to behave as if it were an inductor for power factor measurements. It is also recognized that when the pulse(s) 27 is (are) placed symmetrical about the peak of the sine wave 19 or one pulse 27 is place at the peak (as in FIG. 4), The power factor effect is neutral (i.e., power factor=1.0). It is recognised that the number, position, and/or width/duration of each cut-out pulse 27 of a plurality of cut-out pulses 27 (see FIGS. 5a,b) introduced into each of the half cycles 15,17 is variable/customizable, as further discussed below.

Example Systems 16,42 Embodiment of the Controller Device 30

Figure 7:
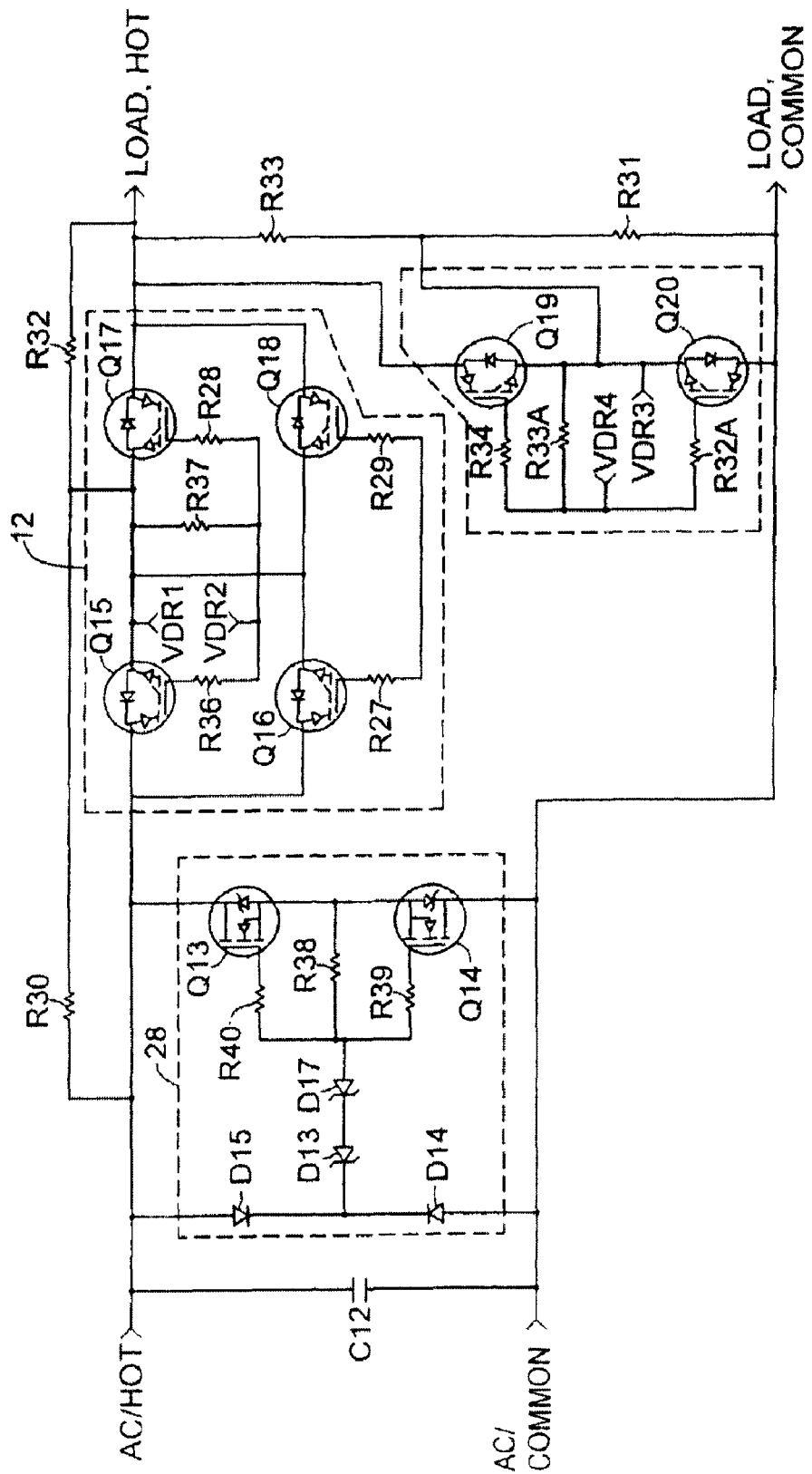
FIG. 7 is a circuit diagram of an embodiment of the power reduction system of FIG. 3.

Referring to FIG. 7, the power switching section of the power control device 30, namely switch 12 (block containing Q15,Q17), switch 26 (containing Q19,Q20) and transient suppressor 28 (block containing Q13,Q14 and C12), is shown by example only. As mentioned above, the bilateral power control switch 12 is connected in series between the AC power supply 21 and the load 14. The switch 12 can include two series connected FET transistor devices Q15 and Q17, each of which include a reverse poled diode connected across its controlled-conduction circuit, thus permitting each of the transistor devices Q15 and Q17 to conduct a current from emitter to collector. The driver circuit 22 is connected to the power control switch 12 via terminals VDR1 and VDR2, and in particular the drive signal [A] is provided to the gates of each of the transistor devices Q15 and Q17 through resistors R36 and R28, respectively, via connection VDR2. A resistor R37, which is connected between the gates and emitters of transistor devices Q15 and Q17, can provide gate protection when drive signal A is not in use (i.e., during start up and shut down of power). When the drive [A] signal is high, during the positive half-cycle 15 of line voltage 21, current will flow through the channel between collector and emitter of transistor device Q15 and subsequently through the diode included in device Q17. When the drive [A] signal is high, during the negative half-cycle 17 of line voltage 21, current will flow through the channel between collector and emitter of transistor device Q17 and subsequently through the diode of transistor device Q15. When the drive [A] signal is low, transistor Q15 blocks current flow during the positive half-cycle 15 of line voltage 21, and transistor device Q17 blocks current flow during the negative half-cycle 17 of line voltage 21.

As illustrated by example, the transistor devices Q15, Q17 and resistors R36 and R28 make up a first switching device/element of the power control switch 12. A second switching device/element, provided by transistor devices Q16, Q18 and resistors R27 and R29 is connected in parallel with the first switching device/element to help increase the current carrying capacity of the power control switch 12. The second switching device/element can be identical in operation and construction to the first switching device/element. The power control switch 12 can include as many parallel connected switching devices/elements as are desired to meet the current carrying requirements of the controller device 30.

The energy return switch 26 is also a bilateral high speed switch, and is connected in parallel with the load 14 to recirculate any inductively stored power in the load 14 when the power control switch 12 ceases conducting. The energy return switch 26 can be similar in construction and operation to the switching devices/elements which make up power control switch 12. In this regard, the energy return switch 26 can include two series connected FET transistor devices Q19 and Q20, each of which includes a reverse poled diode connected across its controlled-conduction circuit. The driver circuit 22 is connected via terminals VDR3 and VDR4 to the energy return switch 26 such that the drive signal B is provided to the gates of transistor devices Q19 and Q20 via resistors R34 and R32A, respectively. As in power control switch 12, a resistor R33A can provide gate protection during circuit start up and shut down.

The high power transient suppressor 28, which is connected in parallel with the AC supply line 29, can provide high speed sub-microsecond response to voltage transients. The transient suppressor 28 can include two series connected MOSFET transistor devices Q13 and Q14 which each include a reverse polled zenor diode connected across their controlled conduction circuits. The gates of the transistor devices Q13 and Q14 are connected via resistors R40 and R39, respectively, to series connected zenor diodes D13 and D17, which are in turn connected by steering diodes D14 and D15 to the AC supply line 29. Whenever the line voltage 21 exceeds the combined threshold voltages of zenor diodes D13 and D17, the transistors Q13 and Q14 will each be switched into a conducting state, and when the line voltage 21 is less than the combined thresholds of zenor diodes D13 and D17, the transistor devices Q13 and Q14 will be in an off state. Diodes D15 and D14 provide polarity steering of the line voltage 21 as provided to the zenor diodes D13 and D17. When transistor devices Q13 and Q14 are each in the "linear on state" during the positive half-cycle 15 of the AC line voltage 21, current travels through the channel between drain and source of transistor device Q13 and body diode of Q14, the level of current is controlled by the negative feed back D15+D13+D17+R40 and gate of Q13. When the transistor devices are in the "linear on state" during the negative half 17 of the AC cycle 19, current travels through the channel between source and drain of device Q14 and body diode of Q13 of transistor device Q13. Resistor R38 is included in the transient suppressor 28 to help provide automatic decay of any gate signal when no clamping is required. This set of components demonstrate a circuit embodiment of the "Active Voltage Clamp".

The power control can also include a transistor C12 across the AC input terminals to provide high frequency filtering. The value of C12 can be increased to perform the voltage limiting itself as described above. As indicated, resistors R30, R32, R33 and R31 can be included to help provide charge/discharge control during starting up and open circuit conditions to protect the switching devices/elements of power control switch 12 and energy return switch 26, i.e., the switching system 42.

Cut-out Pulse 27 Parameters 40

Figure 5A:
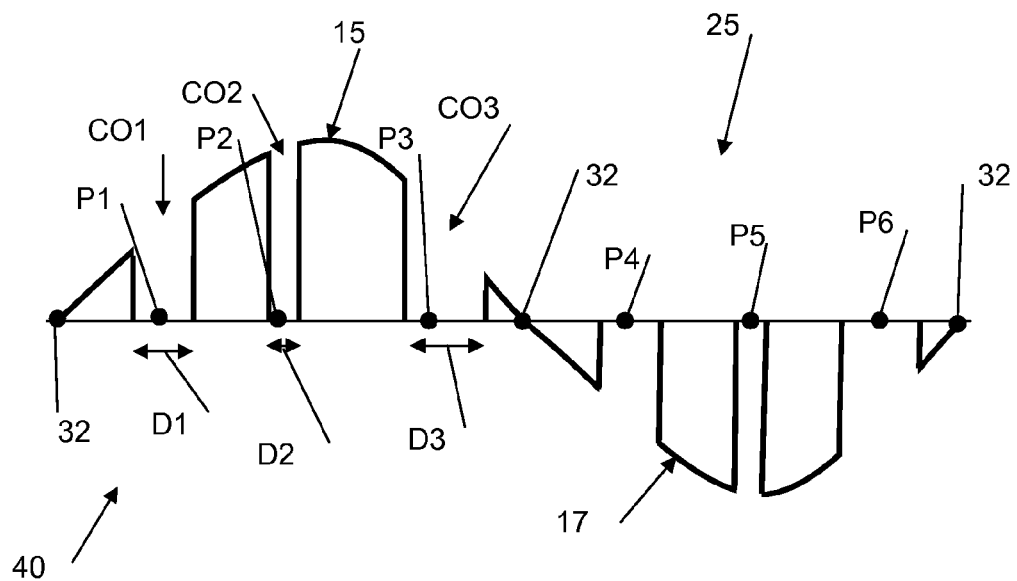
FIGS. 5a,b show alternative embodiments of the cut-out pulses of FIG. 4.

Referring to FIGS. 5a,b and 6, shown are various cut-outs 27 positioned for various example cut-out configurations in the half cycles 15,17. For example, FIG. 5a shows three cut-outs 27 (CO1, CO2, CO3) of different durations D1,D2, D3 (i.e., pulse width) and of different positions P1,P2,P3 (i.e., pulse location in the period of the overall cycle 19 of the waveform 10. It is recognised that the cut-out pulses 27 at position P4 is the same duration D1 of CO1, at position P5 is the same duration D2 of CO2, and at position P6 is the same duration D3 of CO3 (e.g., an example of symmetry for pulse 27 application in each corresponding half cycle 15,17 of the waveform cycle 19). Accordingly, the duration, width, and location of the cut-out pulses 27 in the first positive half cycle 15 are the timed equivalent (i.e., the position and duration of each corresponding cut-out pulse 27 in one half cycle 15 is the same distance from the cycle 19 midpoint 32 as each corresponding cut-out pulse 27 in the negative half cycle 17) of the cut-out pulses 27 in the second, negative half cycle 17, for example, such that the position and width of cut-out pulses 27 is the same in the positive 15 half cycle and negative half 17 cycles.

It is also recognised that there could be a different combination of cut-out pulse 27 number, position Pi, and duration Di in each half cycle 15, copied to 17 of the full cycle 19, such that each combination would result in the same power reduction (i.e., power reduction in the half cycle 15, copied to 17 due to summation of the respective power reduction for each cut-out pulse 27 over the duration of the respective half cycle 15,17—i.e., half periods of the full cycle 19). This is an example of asymmetry for pulse 27 application in each corresponding half cycle 15,17 of the waveform cycle 19.

It is recognised that one potential disadvantage of unequal power reduction in each half cycle 15, improperly copied to 17 of the full cycle 19 will induce saturation of the magnetic core elements of the environment 8 (e.g., of the load 14 and/or the controller device 30). For example, the time-derivative term in Faraday's Law shows that the flux in a transformer core (e.g., inductive element) is the integral of ampere turns with respect to time resulting from the applied voltage. Hypothetically an ideal transformer (e.g., inductive element without a magnetic core) would work with direct-current excitation, with the core (e.g., inductive element) flux increasing linearly with time. In practice, the flux would rise to the point where magnetic saturation of the core (e.g., inductive element with iron or ferrite core) occurs, causing an undesirable increase in the magnetizing current and overheating the transformer (e.g., inductive element). All practical transformers (e.g., inductive elements) of the environment 8 should therefore operate with symmetrical alternating current, such that the current/voltage variation over the first half cycle 15 should match the current/voltage variation over the second half cycle 17, in order to inhibit undesirable saturation of inductive elements of the load 8 and/or controller device 30.

Figure 5B:
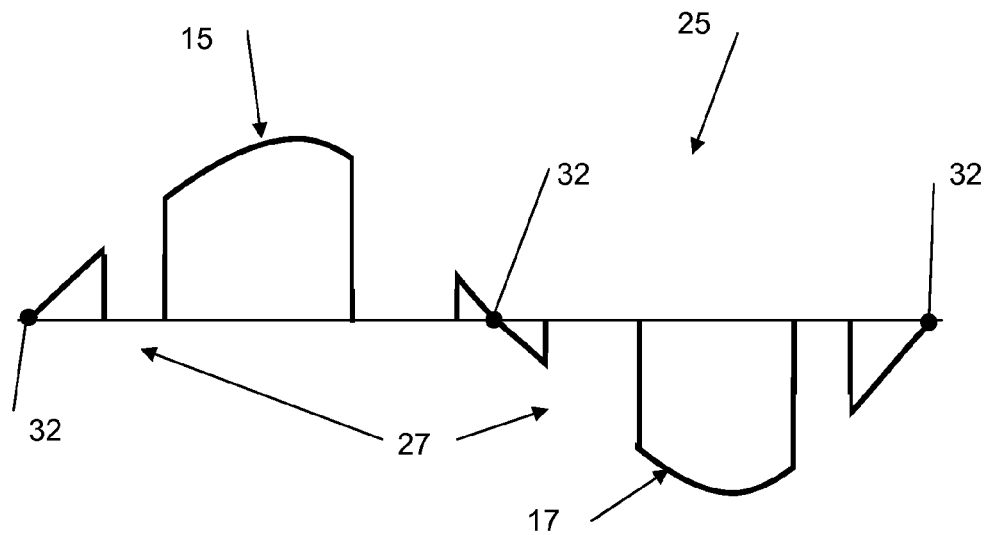

Referring to FIG. 5b, shown is an alternative arrangement of the cut-out pulses 27 such that each half cycle 15,17 contains two cut-out pulses 27.

Figure 6:
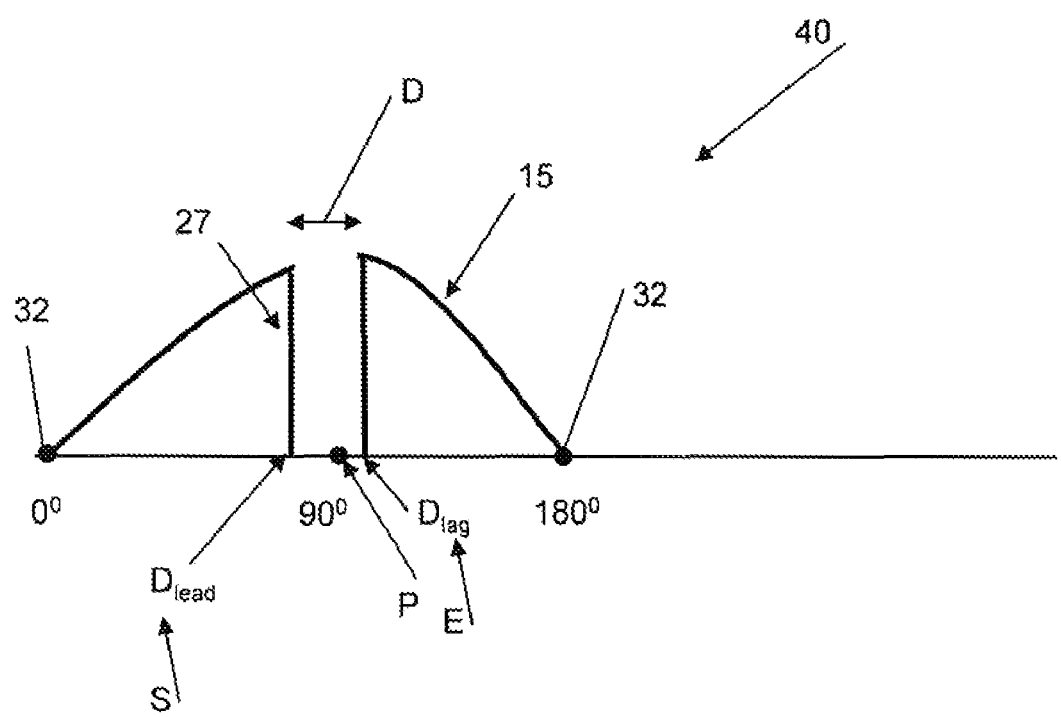
FIG. 6 shows example parameters of the cut out pulses of FIGS. 4 and 5a,b.

Referring to FIG. 6, shown is an example cut-out pulse 27 having the pulse parameters 40 (i.e., pulse variables) of position [P] (e.g., specified by in the half cycle 15,17), total duration [D] having a start [S] of the cut-out pulse 27 being a lead distance Dlead from the position [P] and an end of the cut-out pulse 27 being a lag distance Dlag from the position

[P]. For example, the cut-out pulse 27 could have a position P of 90 degrees, a Dlead of five degrees in front of position [P] and a Dlag of three degrees behind the position P, which would result in the cut-out pulse 27 having a duration/width [D] of 8 degrees (Dlead+Dlag) off center from the position [P]. It is also recognised that the cut-out pulse 27 can be defined using parameters of duration [D] and position [P], such that the position [P] is located at either the start [S] (e.g., the position [P] leads the duration [D]) or the end [E] (e.g., the position [P] lags the duration [D]) of the duration [D] of the cut-out pulse 27. It is also recognised that the duration [D] could be located on the position [P] defined as a certain distance/proportion to either side of the position [P]. For example, the cut-out pulse 27 can be located equally about the position [P] (i.e., a duration [D] of 8 degrees would have 4 degrees in front of and 4 degrees behind the position [P]). Also, unequal proportions could also be defined for the duration [D] about the position [P] (e.g., one quarter in front and three quarters behind meaning a duration [D] of 8 degrees would have 2 degrees in front of and 6 degrees behind the position [P]). In any event, it is recognised that the parameters 40 of the cut-out pulse 27 could be used to independently specify the start [S] and end [E] of the cut-out pulse 27 about the position [P].

One advantage of specifying the start [S] of the cut-out pulse 27 independently of the end [E] is where the duration [D] is dynamically adjusted by the processor 108 after the cut-out pulse 27 has started but before the cut-out pulse 27 has ended. For example, an intended/defined cut-out pulse 27 of position [P] degrees with a defined duration [D] degrees could be dynamically adjusted (e.g., by lengthening or shortening the intended duration [D] by a dynamically determined number of degrees) after starting/initiation in the cycle 15 at a dynamically determined degree time/distance after the start [S] but before the time/distance of the end [E] is reached. For example, an intended/defined cut-out pulse 27 of position P=90 degrees with a duration [D]=8 degrees (with the start [S] at 88 degrees—e.g., Dlead=2 degrees) could be dynamically adjusted after starting/initiation in the cycle 15 by the dynamically determined time/distance of 6 degrees after the start [S] (e.g., at 94 degrees in the cycle 19) but before the time/distance of the end [E] (e.g., 96 degrees) is reached. In this example, the originally defined Dlag=6 degrees could be dynamically lengthened or shorted by selected number of degrees. One advantage for dynamic adjustment of the Dlead and/or Dlag of an intended/defined cut-out pulse 27 could be for providing/confirming that the summation of power reduction of the first half cycle 15 cut-out pulses 27 matches the summation of power reduction of the second half cycle 17 cut-out pulses 27, for saturation considerations.

It is recognized that in an alternative embodiment, the processor 108 can initiate a variable pulse 27 width at starting position P (zero=no pulse) and expanding the width symmetrically on either side of [P] until a limit condition of Dlead or Dlag is reached. Following this limit condition the pulse 27 width is expanded only in the direction of non-symmetry allowed, for example in the case of FIG. 6 towards Dlead until pulse width [D] is reached. Pulse width [D] itself can be a variable element of the pulse cut-out 27. In any event, it is recognised that the processor 108 of the controller device 30 (see FIG. 9) coordinates or otherwise monitors the selection of the parameters 40 for affecting the application of the cut-out pulses 27 in the half cycles 15,17 of the waveform 10 of the line power 21, to result in the modified power 25 going to the load 14 coupled to the controller device 30.

It is also recognised that for power control purposes, the cut-out pulses 27 can be positioned in each half cycle 15,17 asymmetrically, such that symmetry of the cut-out pulses 27 on the full cycle 19 provides for inhibition of inductive element saturation, as discussed above.

It is also recognised that the independent definition of the start [S] and end [E] points of the cut-out pulses 27 provides for degree based selection of the position [P] and corresponding duration [D] of the cut-out pulses 27, as compared to simple time division, such that the cut-out pulses 27 can be placed at X degrees on the waveform 10 and tracked in terms of duration [D] irrespective of the frequency F of the line power 21, for example. This time vs degrees distinction can be implemented by the system 16 in providing modified power 25 for multi-frequency environments. (i.e., 50 Hz and 60 Hz).

Example Controller Device 30

Figure 8:
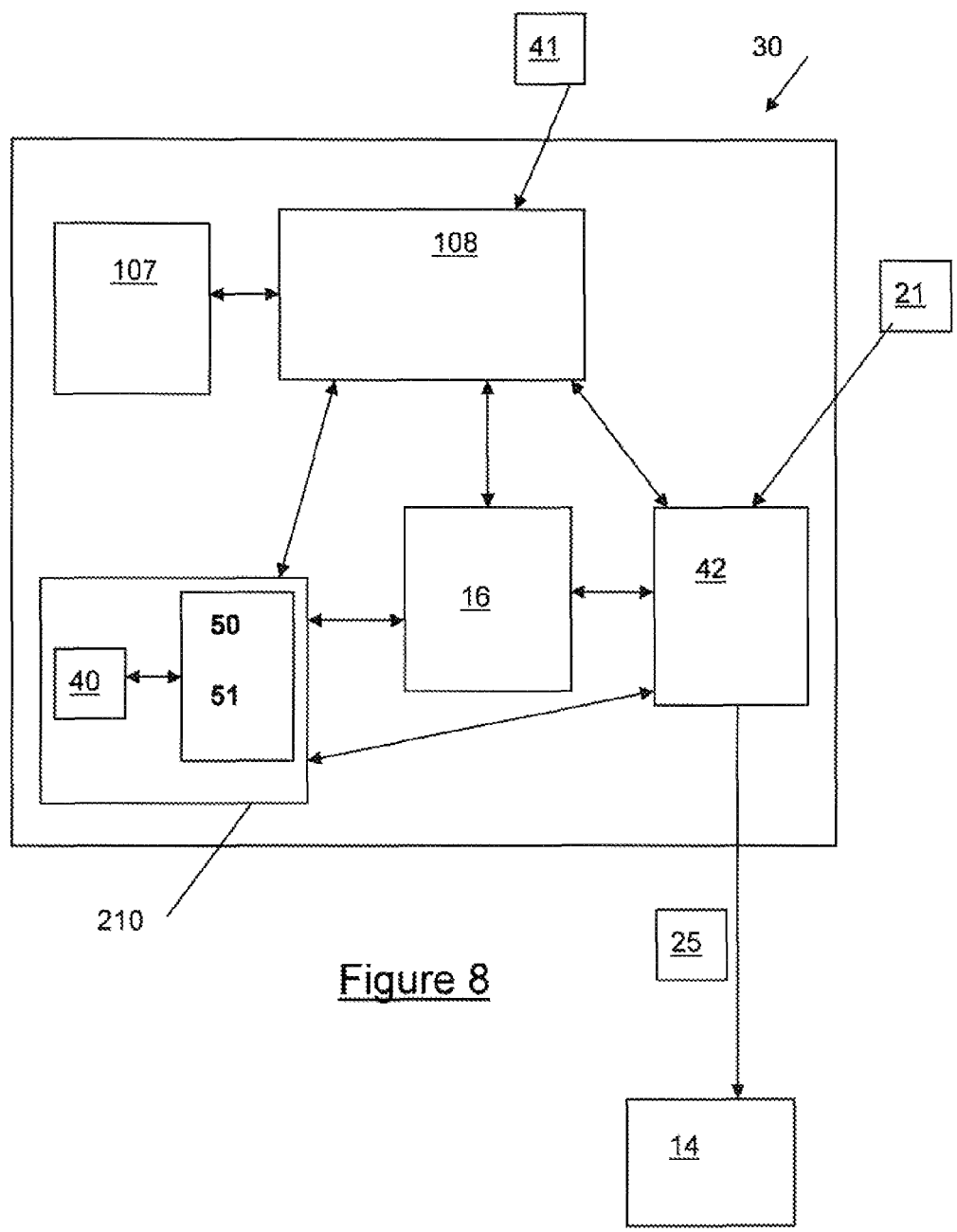
FIG. 8 is an alternative embodiment using a microprocessor for control of power reduction system of FIG. 3.

Referring to FIG. 8, shown is an embodiment of the controller device 30 having a processor 108 (e.g., microprocessor) that is configurable for controlling the operation of the switching apparatus 16 and the switching system 42 via the set of parameters 40 stored in a table 210 or other storage structure. The control device 30 can also have a set of configurable instructions 107 (e.g., software) for configuring the operation of the processor 108 with respect to the control of the switching apparatus 16 and the switching system 42 operations. It is also recognised that the processor 108 can use environmental parameters 41 as further control parameters (in addition to and/or in substitution of the control parameters 40 of storage 210). The environmental parameters 41 can include parameters such as but not limited to user selected degrees of power reduction (e.g., specifying the amount of power reduction desired as a percentage reduction of the maximum available line power 21), ambient light levels (e.g., based on time of day and/or measurement of sunlight intensity/amount available as natural light in the vicinity of the lighting loads 14) in the surroundings (e.g., room) of lighting loads 14, desired torque and/or speed of the electrical motor load 14 (e.g., the controller device 30 is used as a torque/speed controller for the electric motor load 14), and other parameters 41 as desired.

For example, the microprocessor 108 can be configured for controlling the form factor of the pulse structure 27 in the waveform 10. The microprocessor 108 could control operation of the device circuits (e.g., systems 16,42) to provide for customizable variability (manually selected or otherwise) in the degree of power reduction between the line power 21 and the modified power 25, in order to adjust the level of power removed from the main line power 21 for different configurations/consideration for lighting load 14, environmental factors 41 (e.g., natural light conditions or remotely controlled lighting conditions), and main line power 21 characteristics. Automatic feedback to the microprocessor 108 for the different configurations/consideration is also contemplated, e.g., via the environmental factors/parameters 41, in order to provide for auto correction in the power reduction in the power 25 provided by the device 30. Accordingly, as discussed above, it is recognised that the number, position, and/or width/duration of each cut-out pulse 27 of a plurality of cut-out pulses 27 (see FIGS. 5a,b) introduced into each of the half cycles 15,17 is variable/customizable by the processor 108, as further discussed below. Further, it is recognised that the timing of the switching control apparatus 16 (i.e., via the digital clock cycling of the processor 108) is synchronized with the analogue timing of the line power 21 and tracks normal variations in the timing of 21. In this manner, the power reduction in the analogue line power 21 is controlled by the digital processing logic of the processor 108 and associated controlled systems 16,42.

Referring again to FIG. 8, the parameters 40 can be defined as a list of predefined cut-out pulse 27 patterns 50,51 for associated input parameters 41 (for example degree of power reduction desired, ambient light conditions, desired output torque and/or speed, and/or lighting type). The different patterns 50,51 can be embodied as different predefined combinations of pulse 27 number per half cycle, pulse duration [D] for each pulse 27 of the pattern 50, pulse position [P] for each pulse 27 of the pulse pattern 50, different Dlead and/or Dlag definitions, and/or load 14 type specific patterns 50,51 (e.g., each defined pattern 50,51 is for a specific lighting 14 type and desired degree of power reduction). The patterns 50,51 may contain a single waveform set of pulses or a series of different sets of pulses.

Further, it is recognised that each of the patterns 50,51 can be normalized with respect to frequency F of the line power 21, such that determination of the frequency F of the line power 21 (e.g., via the synchronization system 18) provides for determination of the degree position [P] for each of the cut-out pulses 27 of a selected pattern 50,51.

Figure 9:
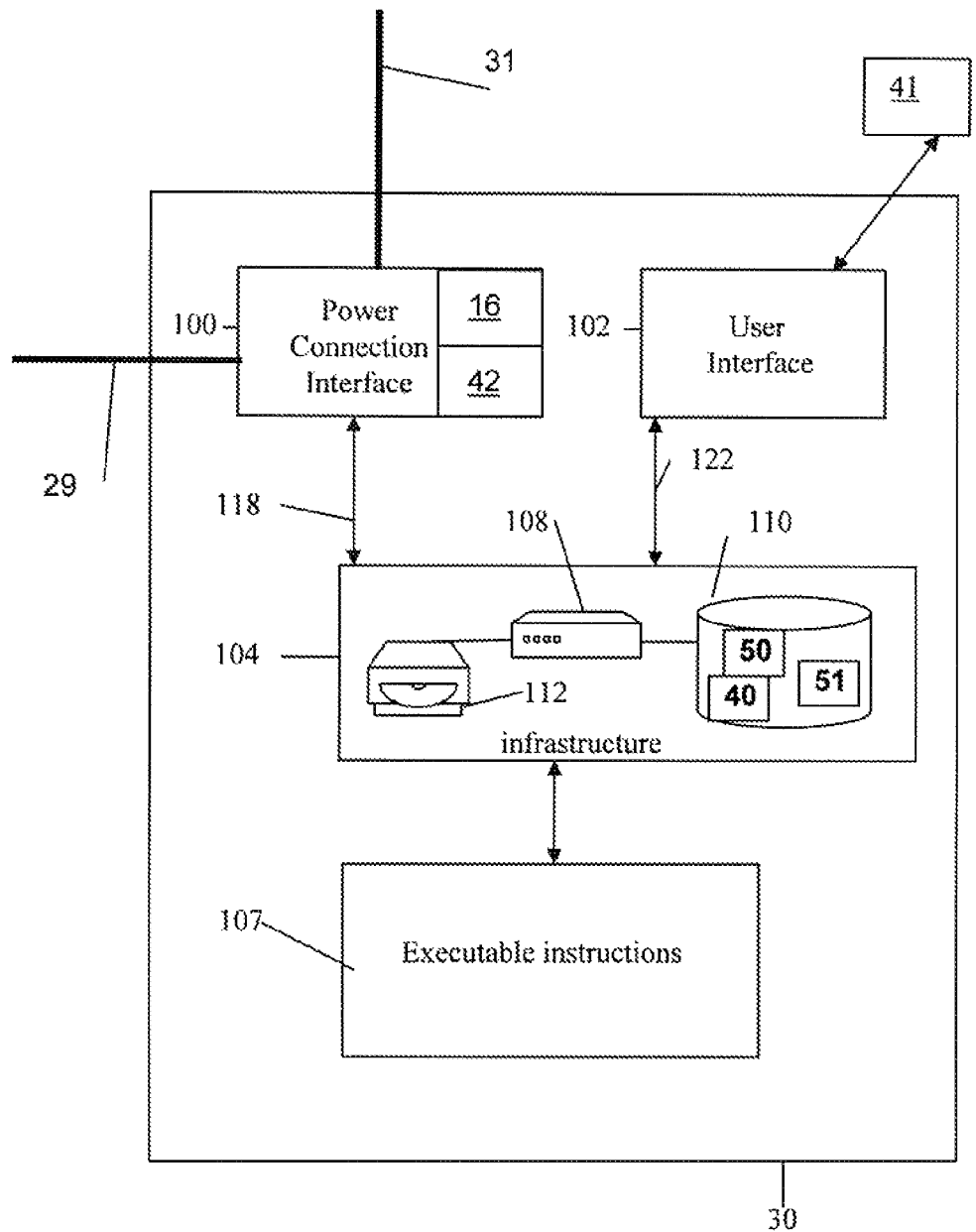
FIG. 9 is an example block diagram of the reduction system of FIG. 3.

Referring to FIGS. 8 and 9, the controller device 30 includes a power connection interface 100 for coupling the controller device 30 to the supply line 29 and to the load line 31. For example, the synchronization system 18, the switching control apparatus 16, the switching system 42, or portion(s) thereof, can be included as part of, or separate to, the power connection interface 100.

The controller device 30 can also have a user interface 102, coupled to a device infrastructure 104 by connection 122, to interact with the user, for supplying control parameters 41 (e.g., to affect the operation of the synchronization system 18 and/or the application of the cut-outs 27 via the system 16) affecting the operation of the controller device 30. The user interface 102 can include one or more user input devices such as but not limited to a QWERTY keyboard, a keypad, a stylus, a mouse, a microphone and the user output device such as an LCD screen display and/or a speaker. If the screen is touch sensitive, then the display can also be used as a graphical user input device as controlled by the device infrastructure 104.

Referring again to FIG. 9, operation of the controller device 30 is facilitated by the device infrastructure 104. The device infrastructure 104 includes one or more computer processors 108 (e.g., microprocessors) and can include the associated memory 110 (e.g., a random access memory). The computer processors 108 facilitate performance of the controller device 30 configured for the intended task(s) through operational control of the respective synchronization system 18, control apparatus 16, and cut-outs 27 via the switching system 42, the user interface 102, and any other application programs/hardware 107 of the controller device 30 by executing task related instructions. These task related instructions can be provided by an operating system, and/or software applications 107 located in the memory 110, and/or by operability that is configured into the electronic/digital circuitry of the processor(s) 108 designed to perform the specific task(s). Further, it is recognized that the device infrastructure 104 can include computer readable storage medium 112 coupled to the processor 108 for providing instructions to the processor 108 and/or to load/update the instructions 107. For example, one or more of the processors 108 could be included directly or otherwise coupled to the systems 16,42. Communication between the device infrastructure 104 and the power connection interface 100 is via link 118. For example, the processor 108 controlling/coordinating the operation of the systems 16,42 via the parameters 40,41 could be a microprocessor.

The microprocessor 108 itself can be an included combination of processors (e.g., main core instruction set/processor with parallel operating RISC set/processor along with the necessary (Read Only Memory) ROM, RAM, EPROM, EEPROM, Flash memory etc.

The computer readable medium 112 can include hardware and/or software such as, by way of example only, magnetic disks, magnetic tape, optically readable medium such as CD/DVD ROMS, and memory cards. In each case, the computer readable medium 112 may take the form of a small disk, floppy diskette, cassette, hard disk drive, solid-state memory card, or RAM provided in the memory module 110. It should be noted that the above listed example computer readable mediums 112 can be used either alone or in combination.

Further, it is recognized that the controller device 30 can include the executable applications 107 comprising code or machine readable instructions for implementing configurable functions/operations including those of an operating system and the systems 16,42, for example. The processor 108 as used herein is a configured device and/or set of machine-readable instructions for performing operations as described by example above. As used herein, the processor 108 may comprise any one or combination of, hardware, firmware, and/or software. The processor 108 acts upon information by manipulating, analyzing, modifying, converting or transmitting information for use by an executable procedure or an information device, and/or by routing the information with respect to an output device. The processor 108 may use or comprise the capabilities of a controller or microprocessor, for example. Accordingly, any of the functionality of the controller device 30 may be implemented in hardware, software or a combination of both. Accordingly, the use of a processor 108 as a device and/or as a set of machine-readable instructions is hereafter referred to generically as a processor/module for sake of simplicity.

The memory 110 is used to store any executable applications 107 as well as any control parameters 40,41 associated with the systems 16,42 and cut-outs 27 processes. General data structure types of the memory 110 can include types such as but not limited to an array, a file, a record, a table, a tree, and so on. In general, any data structure is designed to organize data to suit a specific purpose so that the data can be accessed and worked with in appropriate ways. In the context of the present environment, the data structure may be selected or otherwise designed to store data for the purpose of working on the data with various algorithms executed by components of the controller device 30. It is recognised that the terminology of a table is interchangeable with that of a data structure.

Example Operation of the Controller Device 30

Figure 10:
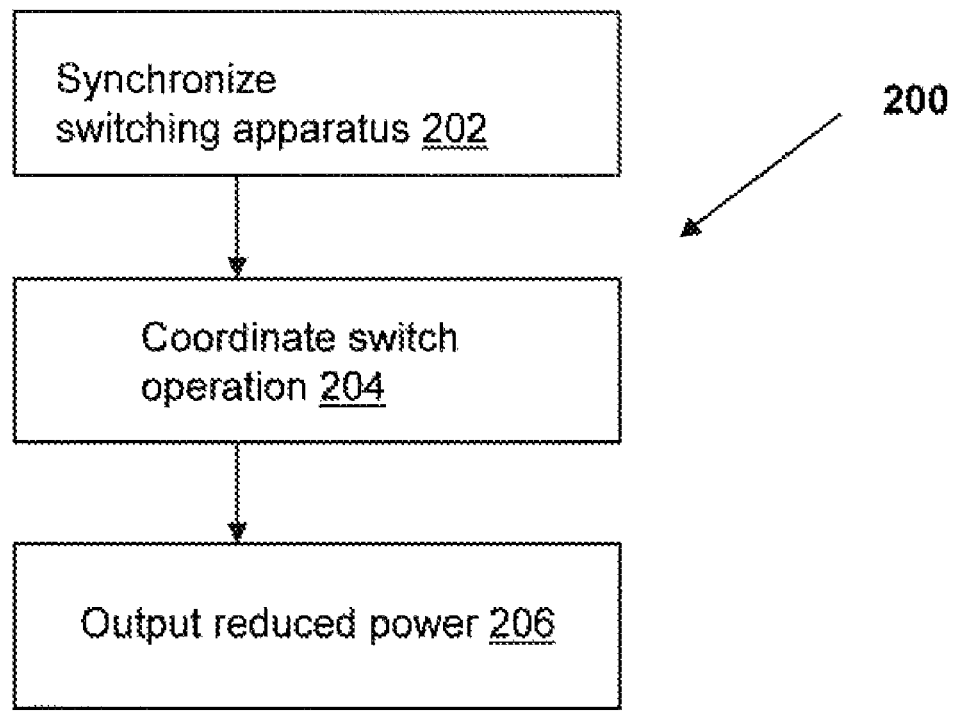
FIG. 10 is a flowchart of operation of the power reduction system of FIG. 3.

Referring to FIGS. 1 and 10, shown is an example operation 200 for modifying an AC input power 21 to provide a reduced power AC output power 25 to a load 14 when coupled to the controller device 30. The AC output power 21 has a series of cut-out pulses 27 (see FIGS. 5*a,b*) applied in half cycles 15,17 of the AC output power waveform 25. At step 202, a synchronization system 18 synchronizes the switching system 16 with timing of the half cycles 15,17 of the AC input power 21 waveform. At step 204, a switch control system 16 coordinates opening and closing of the plurality of switching elements 12,16 during positioning of the series of cut-out pulses 27. At step 206, the system 16 positions the series of cut-out pulses 27 in the half cycles 15,17 of a waveform 19 of the AC input power 21 to result in the reduced power AC output power 25, wherein the series of cut-out pulses includes at least two cut-out pulses having different durations and different positioning in the half cycles 15,17.

It is to be understood that the invention is not to be limited to the exact configuration(s) as illustrated and described herein. Accordingly, all expedient modifications readily attainable by one of ordinary skill in the art from the disclosure and teachings set forth herein, or by routine experimentation deviating therefrom, are deemed to be within the spirit and scope of the invention as defined by the appended claims.

What is claimed is:

1. A controller device for modifying an AC input power to provide a reduced power AC output power to a load when coupled to the controller device, the AC output power having a series of cut-out pulses in half cycles of the AC output power waveform, the device comprising:
   a switching system having a plurality of switching elements for positioning the series of cut-out pulses in the half cycles of a waveform of the AC input power to provide said reduced power AC output power; and
   a switch control system for coordinating opening and closing of the plurality of switching elements to position the series of cut-out pulses in said half cycles, the switch control system including a synchronization system for synchronizing the switching system with timing of said half cycles of the AC input power waveform;
   wherein the series of cut-out pulses in said half cycles includes at least two cut-out pulses having different durations and different positioning in said half cycles.

2. The controller device of claim 1, wherein the switch control system is configured to dynamically modify the duration of at least one of the cut-out pulses in the series of cut-out pulses during the positioning in said half cycles.

3. The controller device of claim 2, wherein the duration of the at least one of the cut-out pulses is defined by a defined start and a defined end, such that the defined start and end are independently adjustable during the dynamic modification of the duration.

4. The controller of claim 2, wherein the switch control system is configured to dynamically add a further cut-out pulse to the series of cut-out pulses during the positioning in said half cycles.

5. The controller of claim 2, wherein the switch control system is configured to dynamically subtract one of the cut-out pulses from the series of cut-out pulses during the positioning in said half cycles.

6. The controller of claim 2, wherein the switch control system is configured to distribute the series of cut-out pulses asynchronously in said half cycles and the series of cut-out pulses in a first half cycle is symmetric with the series of cut-out pulses in a second half cycle following the first half cycle.

7. The controller of claim 3, wherein the defined start and the defined end are each related to the defined position of the least one of the cut-out pulses in said half cycles.

8. The controller of claim 7, wherein the relation to the defined position is a defined number of degrees away from the degree of the defined position.

9. The controller of claim 8, wherein the defined number of degrees for the start is different than the defined number of degrees for the end.

10. The controller of claim 2, wherein the switch control system is configured to distribute the series of cut-out pulses asynchronously in said half cycles and the series of cut-out pulses in a first half cycle is not symmetric with the series of cut-out pulses in a second half cycle following the first half cycle.

11. A method for modifying an AC input power to provide a reduced power AC output power to a load when coupled to the controller device, the AC output power having a series of cut-out pulses in half cycles of the AC output power waveform, the method comprising the steps of:
   synchronizing timing of the series of cut-out with timing of the half cycles of the AC input power waveform;
   positioning the series of cut-out pulses in the half cycles of the waveform of the AC input power via a plurality of switching elements to provide said reduced power AC output power; and
   coordinating opening and closing of the plurality of switching elements to position the series of cut-out pulses;
   wherein the series of cut-out pulses in said half cycles includes at least two cut-out pulses having different durations and different positioning in said half cycles.

12. The method of claim 1 further comprising the step of dynamically modifying the duration of at least one of the cut-out pulses in the series of cut-out pulses during the positioning in said half cycles.

13. The method of claim 2, wherein the duration of the at least one of the cut-out pulses is defined by a defined start and a defined end, such that the defined start and end are independently adjustable during the dynamic modification of the duration.

14. The method of claim 2 further comprising the step of dynamically adding a further cut-out pulse to the series of cut-out pulses during the positioning in said half cycles.

15. The method of claim 2 further comprising the step of dynamically subtracting one of the cut-out pulses from the series of cut-out pulses during the positioning in said half cycles.

16. The method of claim 2, wherein the series of cut-out pulses are distributed asynchronously in said half cycles and the series of cut-out pulses in a first half cycle is symmetric with the series of cut-out pulses in a second half cycle following the first half cycle.

17. The method of claim 3, wherein the defined start and the defined end are each related to the defined position of the least one of the cut-out pulses in the half cycles.

18. The method of claim 2, wherein the series of cut-out pulses are distributed asynchronously in said each half cycle and the series of cut-out pulses in a first half cycle is not symmetric with the series of cut-out pulses in a second half cycle following the first half cycle, such that parameters of the series of cut-out pulses in the first half cycle and the parameters of the series of cut-out pulses in the second half cycle are chosen to make the power reduction in the half cycles the same.

19. The method of claim 11, wherein the frequency of the AC input power is the same as a frequency and phase position of the AC output power.

20. A fluorescent lighting system to more efficiently use and conserve an AC input power by applying a reduced power AC output power to fluorescent lighting while providing operational lighting intensity for the fluorescent lighting, the system comprising:
   one or more fluorescent lights for receiving the reduced power AC output power;
   a controller device for modifying the AC input power to provide the reduced power AC output power to the one or more fluorescent lights when coupled to the controller device, the AC output power having a series of cut-out pulses in half cycles of the AC output power waveform, the device comprising:
      a switching system having a plurality of switching elements for positioning the series of cut-out pulses in the half cycles of a waveform of the AC input power to provide said reduced power AC output power; and a switch control system for coordinating opening and closing of the plurality of switching elements to position the series of cut-out pulses in said half cycles, the switch control system including a synchronization system for synchronizing the switching system with timing of said half cycles of the AC input power waveform, wherein the series of cut-out pulses in said half cycles includes at least two cut-out pulses having different durations and different positioning in said half cycles.

* * * * *